United States Patent [19]
Liu et al.

[11] Patent Number: 5,781,268
[45] Date of Patent: Jul. 14, 1998

[54] POLARIZATION-INSENSITIVE FABRY-PEROT TUNABLE FILTER

[75] Inventors: Jian-Yu Liu; Charles S. Wong, both of Boulder; Kristina M. Johnson, Longmont; Gary D. Sharp, Boulder, all of Colo.

[73] Assignee: Board of Regents of the University of Colorado, Boulder, Colo.

[21] Appl. No.: 629,976

[22] Filed: Apr. 9, 1996

[51] Int. Cl.$^6$ .................... G02F 1/1335; G02F 1/139
[52] U.S. Cl. ................... 349/198; 349/119; 349/121; 349/172
[58] Field of Search ................... 349/198, 104, 349/117, 105, 121, 119, 18, 171, 172; 359/260; 356/352; 372/105, 106; 385/12, 74

[56] References Cited

U.S. PATENT DOCUMENTS

| | | | |
|---|---|---|---|
| 5,033,825 | 7/1991 | Ishikawa et al. | 350/339 R |
| 5,150,236 | 9/1992 | Patel | 359/71 |
| 5,168,383 | 12/1992 | Iwaki et al. | 359/71 |
| 5,321,539 | 6/1994 | Hirabayashi et al. | 349/198 |
| 5,552,912 | 9/1996 | Sharp et al. | 349/117 |

OTHER PUBLICATIONS

Evans, J.W. (Mar. 1949), "The Birefringent Filter," *J. Opt. Soc. Am.* 39(3):229–242, Mar. 1949.

Title, A.M. and Rosenberg, W.J. (1981), "Tunable birefringent filters," *Opt. Eng.* 20(6):815–823, Dec. 1981.

*Primary Examiner*—William L. Sikes
*Assistant Examiner*—Tai V. Duong
*Attorney, Agent, or Firm*—Greenlee, Winner & Sullivan, P.C.

[57] ABSTRACT

This invention provides polarization-independent optical filters that are Fabry-Perot filters. The inventive filters incorporate a phase modulator within the FP cavity and two quarter-wave plates, one on either side of the phase modulator, in the cavity. The quarter-wave plates are perpendicular to each other and oriented at ±45° with respect to the optic axis of the phase modulator. A variety of phase modulators including those that incorporate nematic and smectic liquid crystal optical modulators can be employed in these FP filters. The filters of this invention are particularly useful in fiber optic systems and in telecommunications applications at 1550 nm.

26 Claims, 8 Drawing Sheets

POLARIZATION-INSENSITIVE FABRY-PEROT TUNABLE FILTER

FIELD OF THE INVENTION

This invention relates to polarization-insensitive tunable Fabry-Perot FB optical filters, particularly those employing liquid crystal materials in tuning elements.

BACKGROUND OF THE INVENTION

The use of optical fibers in telecommunication networks is gaining favor as a method for increasing the capacity, and providing longer communication links and system economy for the network. Since the bandwidth, or the information carrying capacity of optical fiber, is about 200 nm (25 THz) at 1550 nm, wavelength division multiplexing can fit 256, 0.8 nm channels within this bandwidth. Inexpensive, high speed, wide range tunable optical filters are needed to take advantage of this fiber capacity.

Polarization-sensitivity is a characteristic of many optical filters and represents a severe limitation in certain filtering applications. Light coming out of an optical fiber has its polarization drifted in time due to the temperature and stress variations. Thus, filtering applications in optical fibers, for example in wavelength division multiplexing, where input polarization is unknown or cannot be selected, are significantly limited by polarization sensitivity.

For arbitrary polarized input, an optical filter typically decomposes the polarization into two eigen states: one which interacts with the ordinary index of refraction ($n_o$) and the other which interacts with the extra-ordinary index of refraction ($n_e$). In such cases, the filter transmits two peaks, one associated with each polarization eigen state. Use of an entrance polarizer eliminates the untuned resonant peak (the ordinary wave), but also eliminates a significant portion of the input intensity. With arbitrary input polarization from a fiber, a polarizer may cause more than 3 dB loss of polarization perpendicular to the input polarizer.

Conventionally, polarization sensitivity has been solved by use of polarization-diversity techniques. (See, for example a description of such techniques applied to FP filters in U.S. Pat. No. 5,493,426) Such techniques split the input light into orthogonal polarizations, modulate each component separately and then recombine the two polarizations. For FP filters, polarization diversity effectively constitutes the use of two FP cavities (or at least spatial separation in a single cavity). Careful fabrication process and balanced electronic drivers are required to achieve substantially identical resonance conditions for both polarizations. These requirements increase production difficulties, increase manufacturing cost and can make high-volume commercial device manufacturing impractical.

U.S. Pat. No. 5,068,749 of Patel, issued Nov. 26, 1991, relates to an electronically tunable polarization-independent FP filter employing nematic liquid crystal materials. A nematic liquid crystal layer is introduced between the opposed mirrors of a FP cavity and electrodes are provided to allow a variable electric field to be applied across the layer. A $n\pi/2$ twist (where n is a positive odd integer) of the principal axis of the LC material is introduced across the LC material by selecting the relative orientation of LC alignment layers on either side of the LC layer. In the specifically exemplified filter, alignment layers on either side of the LC layer were oriented perpendicular to each other. In this device, wavelength tuning is said to be independent of input light polarization.

U.S. Pat. No. 5,111,321 of Patel issued May 5, 1992, reports a tunable dual-polarization FP filter having a twisted nematic liquid crystal layer between opposing interference mirrors. The twisted nematic LC layer is divided into two portions by use of a two-portion alignment layer on at least one side of the nematic LC layer. The two-portion alignment layer is homogeneous, but the alignment of the portions are orthogonal to each other. The orthogonal portions of the LC layer are said to operate in equal amounts on orthogonal polarizations of light with resultant polarization insensitive tuning when input light is divided between the two portions of the LC layer.

U.S. Pat. Nos. 5,469,279; 5,381,253; 5,552,912 and 5,493,426 all of which are incorporated in their entirety by reference herein, relate to folded path configurations of high resolution optical filters and modulators, i.e., within a FP cavity, including those that use LC materials as tuning elements. These filters, all of which are employed in combination with polarized input light, are not described, used, or applied as polarization-independent filters. The multipass filter configuration of U.S. Pat. No. 5,469,279 has an etalon (FP cavity) containing two quarter-wave plates with a central retarder (at $\Gamma$ (retardance) of $\pi$ or $\pi/2$, full or half wave, respectively) between the quarter-wave plates and an optional intracavity isotropic space. The QHQ (quarter-half-quarter) configuration of this patent modulates phase by changing the polarization of light. In the "folded Solc filter" the central retarder is a half-wave retarder oriented at a rocking angle, $\rho$, and the quarter-wave plates are parallel to the input polarization. In an alternate "fan Solc filter" configuration, the central retarder is a full wave plate ($\Gamma=\pi$) orientated at angle, $\rho$.

The optical modulator of U.S. Pat. Nos. 5,381,253, 5,552,912 and 5,493,426 provide modulation of phase, intensity, and wavelength of polarized light. The exemplified configurations have chiral smectic liquid crystal cells which are planar aligned, homeotropically aligned or tilted-layer aligned. QHQ configurations in which the half-wave plate is a planar aligned chiral smectic liquid crystal are also provided.

SUMMARY OF THE INVENTION

This invention provides polarization-insensitive Fabry-Perot filters for use with any arbitrary polarized input light. These filters comprise a phase modulator positioned between crossed quarter-wave plates (QWPs) within an FP cavity. The QWPs are oriented at an angle + or − 45° from the optic axis of the phase modulator.

Most polarization-dependent phase modulators can be employed as an element in the inventive filters. Phase modulators which achieve modulation by varying the polarization of input light will not, however, function in this invention. Apart from this limitation, phase modulators containing active, passive or both active and passive birefringent materials as elements can be employed in filters of this invention. Phase modulators containing active liquid crystal elements alone or in combination with passive birefringent elements can be employed in the filters of this invention. Phase modulators comprising liquid crystals, liquid crystal polymers or nonlinear electro-optic polymers, among others, can function in this invention.

Any QWPs can be employed as elements in the polarization-insensitive filters of this invention. Zero-order QWPs are preferred. Passive QWPs are also preferred. For WDM systems in telecommunications applications at 1550 nm, preferred QWPs are those with thicknesses narrow enough to construct FP cavities less than or equal to about 20 μm. Zero-order QWPs with thickness less than about 5 μm are preferred for applications in optical fiber telecommunication.

Polarization-insensitive FP of this invention do not require the use of entrance or exit polarizers. Because of this feature, they are well suited for use in fiber optic systems.

The invention is also directed to methods of filtering light of arbitrary unselected polarization employing an FP filter consisting essentially of an FP cavity containing a phase modulator positioned between two quarter-wave plates wherein the QWP's are oriented perpendicular to each other and at an angle of + or −45° to the optic axis of the phase modulator.

The polarization insensitive FP filters of this invention can be employed in any optical system device including filters, sensors, spectrometers, fiber optical systems or communication systems in which FP filters can be employed. Preferred applications are those where the insensitivity of the filter to polarization benefits the performance of the device or systems, for example, by enhanced signal intensity or enhanced signal resolution.

BRIEF DESCRIPTION OF THE FIGURES

FIG. 2 is a scheme illustrating the operation of a polarization-independent filter of this invention. In FIG. 2 R and L are used to designate right- and left-circularly polarized light, respectively; S and P designate linear vertical polarization and linear horizontal polarization, respectively; The symbol (') indicates a single phase modulation; ('') indicates a double modulation; (''') indicates three modulations; etc.

DETAILED DESCRIPTION OF THE INVENTION

This invention relates to optical filters that are polarization-insensitive (i.e., polarization-independent) in which spectral filtering is not affected by differences in polarization of input light. These filters do not require selective polarization of input light and thus in general result in higher levels throughput of a given amount of input light of arbitrary polarization. These filters provide spectral filtering of unpolarized input light or of light of any arbitrary polarization.

The filters of this invention are Fabry-Perot filters in which selected optical elements are positioned within a FP cavity, i.e., an etalon with reflective surfaces separated by a fixed distance, d, wherein the intracavity light can be treated as an infinite number of partial waves produced by the reflections at the two surfaces. At optical resonance, the phase delay attributed to one round trip is an integral number of wavelengths, i.e. $2d=m\lambda/n$, where n is the average index of refraction of the cavity and m is an integer. This resonance condition is satisfied at a series of wavelengths and these transmissions are called FP fringes of order m. The free spectral range (FSR) is the spacing between these peaks. The general operation of FP filters, particularly those containing LC optical elements is described, for example, in U.S. Pat. Nos. 5,469,279 and 5,381,253. FP filters of this invention can be operated in transmission-reflection mode or reflection-only mode.

In transmission-reflection mode, both reflective surfaces of the FP etalon are partially reflective, i.e. the reflectivity, R, of each surface is less than one, such that light can enter through one reflective surface, and undergo multiple internal reflections before the portion of light satisfying the resonance condition exits through the other reflective surface. In reflection mode, one of the reflective surfaces of the etalon is partially reflective and the other is a completely reflective surface, R~1, where it is understood that this is an approximation since totally reflective surfaces can not be manufactured. Light enters the reflection mode etalon through the partially reflective surface, undergoes multiple internal reflection and then exits through the same partially reflective surface. In the reflection mode configuration, input and output light can be spatially separated at the partially reflective surface to discriminate against light that does not satisfy the resonance condition.

In etalon configurations exemplified herein, the reflective surfaces are planar and parallel and light enters at normal incidence. As is known in the art, the same function can be obtained with other cavity geometries which comprise, for example, angled or curved mirrors and non-zero angle of incidence of input light.

A liquid crystal wave plate is a liquid crystal cell containing an aligned liquid crystal layer confined between transparent or semi-transparent substrates provided with electrodes for application of an electric field across the LC layer. A LC layer can be parallel (i.e., homogenous or "bookshelf") aligned or homeotropically aligned. The LC wave plate functions to retard light passing therethrough.

A half-wave plate satisfies the equation: $\Delta nd = \lambda/2$ at the design wavelength $\lambda_d$. LC wave plates are generally formed from uniformly-spaced transparent or semi-transparent inert substrate walls, each wall optionally having an alignment layer on its inside surface in contact with the LC layer between the walls to induce desired alignment. Parallel aligned cells typically can have transparent or semi-transparent electrodes or reflective electrodes at the walls to apply an electric field perpendicular to the LC layer. Homeotropically aligned LC cells have lateral electrodes. LC wave plates of this invention that function as phase modulators or function as elements of phase modulators can employ smectic liquid crystals or various types of nematic liquid crystals. Smectic liquid crystal materials of this invention include chiral smectic C (SmC*), smectic A (SmA), distorted helix ferroelectric liquid crystals (DHF), antiferroelectric and other related liquid crystal materials.

The terms "quarter wave plate" (Q or QWP) and "half wave plate" (H or HWP) are used broadly, herein, unless otherwise stated and take their standard meaning in the art. The qualifying terms "quarter" or "half" refer to a condition at a given design wavelength at which the filter is intended to be operated. Those of ordinary skill in the art can design or select quarter or half-wave plates for a given design wavelength.

The term phase modulator is used generally and broadly herein for any optical device, particularly an electro-optic device that allows discrete or analog phase modulation of input light. A number of phase modulators that can be rendered polarization-independent are described in the discussion below and by reference to art-known phase modulator configurations.

Referring now to the drawings, where like numbers indicate like features and the same number appearing in more than one drawing refers to the same feature, the invention is further illustrated.

Figure 1:
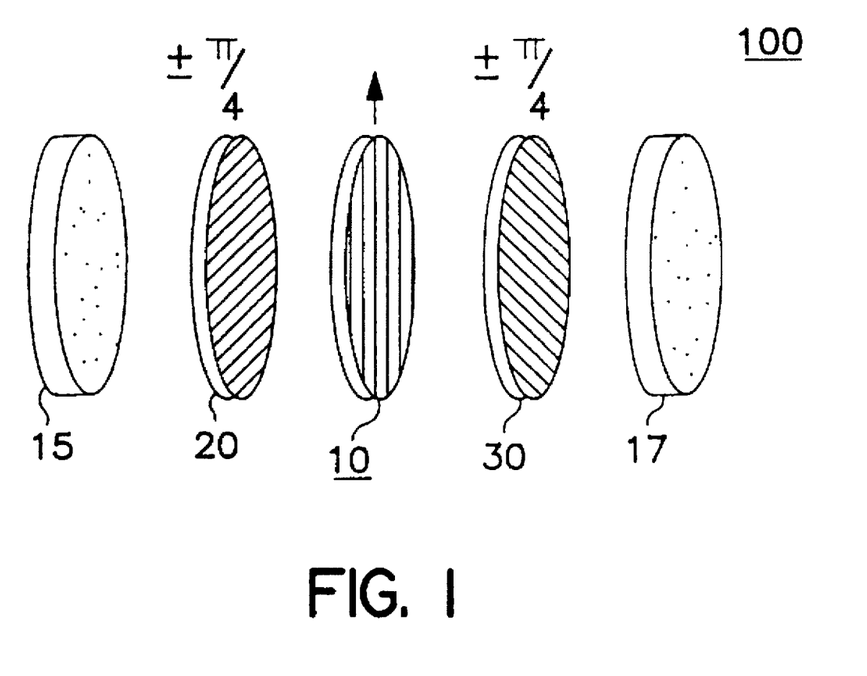
FIG. 1 is a schematic representation of a polarization-independent FP filter of this invention.

FIG. 1 provides a schematic configuration of a polarization-independent FP filter 100 of this invention in which phase modulator 10 is positioned within an FP cavity formed by reflective surfaces (e.g., mirrors) 15 and 17. QWPs 20 and 30 are also within the FP cavity on either side of the phase modulator. The optic axes of the pair of QWPs are oriented perpendicular to each other and at ±45° (±π/4) to the optic axis of the phase modulator. In phase modulators composed of multiple optical elements, the optic axis relative to which the QWPs are oriented is that of the composite phase modulator. No input or exit polarizers are needed to achieve filtering. Input light of arbitrary polarization is modulated by the filter, independent of input polarization.

Figure 2:
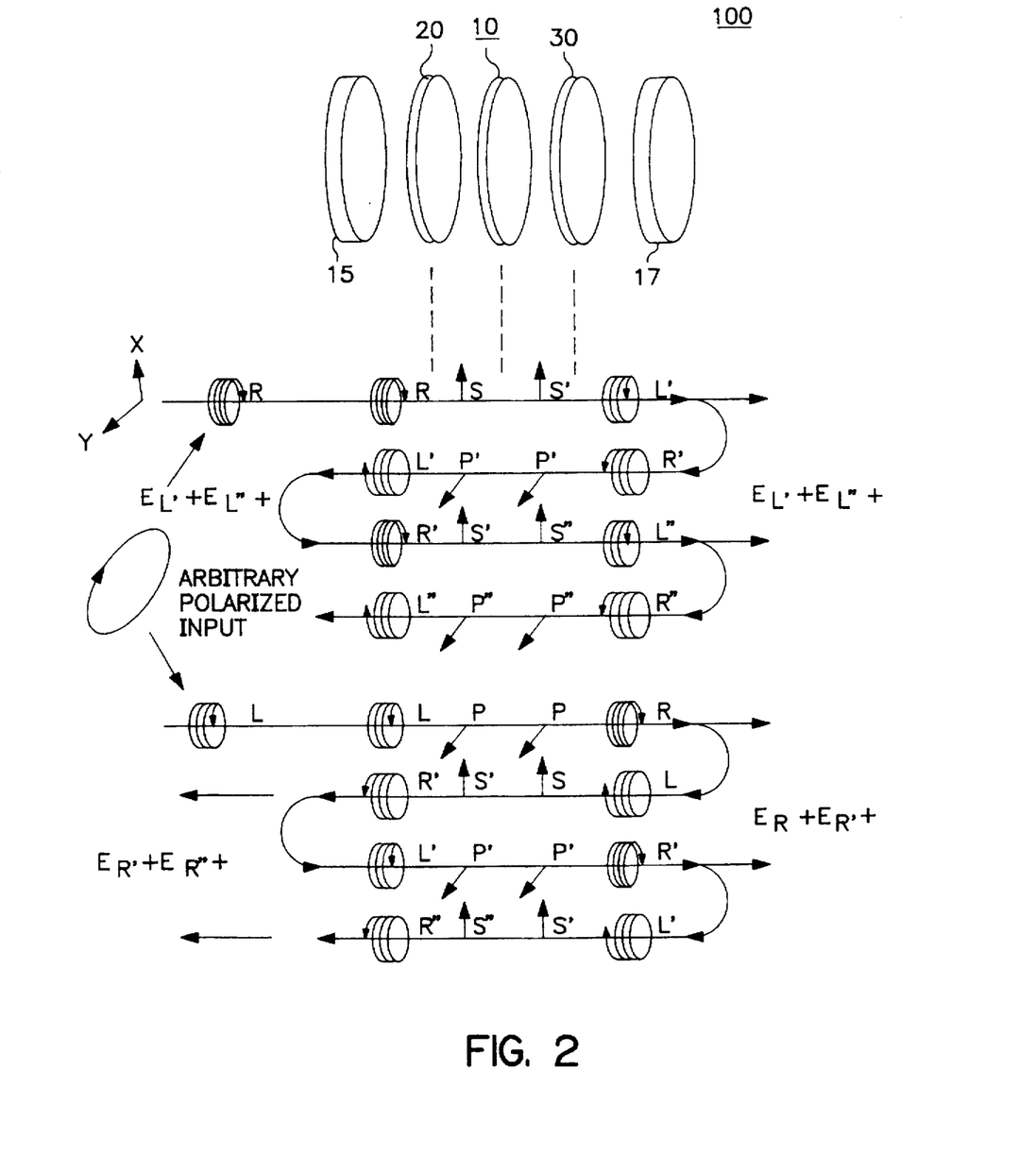

The operation of the polarization-independent filters of this invention is illustrated by reference to FIG. 2 where polarization propagation of R- and L-polarized light on several passes through the FP structure is shown. Elliptically polarized light incident upon the FP filter can be viewed as a superposition of two orthogonal eigen polarizations, for example, left- and right-handed circularly polarized light as illustrated in FIG. 2 where:

$$E_r = A_r(\bar{a_x} + j\bar{a_y}); \quad E_l + = A_l e^{j\phi}(\bar{a_x} - j\bar{a_y}), \quad (1)$$

and where φ is the phase difference between the two circular eigen states and $a_x$ and $a_y$ are unit vectors in the x and y directions as shown in FIG. 2 and $$j = (\sqrt{e - \pi/2})^{-1}.$$

As the right-handed circularly polarized light (R) progresses through filter 100, input R light is converted to linearly polarized (S) light by passage through QWP 20. S polarized light is parallel to the optic axis of phase modulator 10, and is modulated without rotation of the polarization to give S polarized modulated light, S'. The S' light is then converted to modulated left-handed circularly polarized light (L') by passage through QWP 30. Modulated L' light can exit the filter after one pass. Reflection of L' light at the etalon converts the light to right-handed polarization (R' light) and passage back through QWP 30 transforms polarization to give P' linearly polarized light. P polarized light is perpendicular to the optic axis of phase modulator 10 and is not modulated. P' light passes through QWP 20 resulting in L' light. A third pass one-way through the filter gives polarized light that is twice modulated (L"). Five one-way passes give thrice modulated light (L'"') light, etc. Right-handed circularly polarized light entering the filter exits only as left-handed circularly polarized light. In transmission-reflection mode and reflection-only mode, the exiting field due to entering R-polarized light is described by the summation $E_L + E_{L'''} + E_{L'''''} + \ldots$ Again referring to the Scheme of FIG. 2, left-handed circularly polarized light (L) progresses through filter 100 in an analogous fashion to right-handed light. Input L polarized light is converted to linearly polarized R light by passage through QWP 20. P polarized light is not modulated by the phase modulator 10. P polarized light is converted to R polarized light on passage through QWP 30. Unmodulated R light ($E_R$) can exit the filter on the first one-way pass. Reflection of R-handed circularly polarized light at the etalon 17 gives L polarized light and passage back through QWP 30 gives S linearly polarized light. S light is then modulated on passage through the phase modulator to give S' light (once modulated) and passage through QWP 20 gives R' light. A third one-way pass through the filter results in singly modulated R' light. After the fifth one-way pass, doubly modulated R" light can exit the filter. In transmission mode, right-handed circularly polarized light exits the filter according to the equation $E_R + E_{R'} + E_{R''} + E_{R'''} + \ldots$ In reflection-only mode, right-handed circularly polarized light exits the filter according to the equation $E_R + E_{R'} + E_{R''} + \ldots$ As the two eigen fields propagate through FP filter 100 the passage of right- and left-handed circularly polarized light through QWP 20 results in linear polarized light of S or P polarization, respectively. The linearly polarized light is converted to left-handed linearly polarized light and is then rotated by 90° upon reflection from the back mirror due to QWP 30. By changing the state of polarization during a round trip within the cavity, the P or S polarization sees the extraordinary or ordinary, index of refraction, respectively, when propagating forward in the etalon configuration, and the ordinary or extra-ordinary index of refraction, respectively, when propagating in the backward direction in the etalon configuration. The total round trip phase φ for both eigen polarizations is equal to:

$$\phi = \frac{2\pi}{\lambda} [2(n_x + n_y)d_Q + (n_e(V) + n_o)d_l] \quad (2)$$

where λ is the optical wavelength $n_x$ and $n_y$ are the indices of refraction of the fast and slow axes, respectively, of the QWP; $n_e(V)$ and $n_o$ are the extraordinary and ordinary indices of refraction of the liquid crystal, respectively; $d_Q$ is the thickness of the QWPs and $d_l$ is the thickness of the liquid crystal phase modulator. Because the two eigen polarizations exchange states, P<=>S, during a round trip, one is modulated in the forward propagation path and the other in the backward propagation path. The two polarizations, therefore, experience the same accumulated absolute phase, resulting in polarization-insensitive tuning.

The basic principles of this filter design can be illustrated using the simplified 2×2 Jones calculus, as a closed-form solution for the transmission function and the resulting polarization states. The matrix equation describing the field transmitted by an etalon containing isotropic and/or anisotropic media can be written as:

$$E(\lambda) = t \sum_{n=0}^{\infty} [Q^f(\lambda)rQ^b(\lambda)r]^n Q^f(\lambda)tE(\lambda), \quad (3)$$

where E'(λ) and E(λ) are the incident and transmitted complex field amplitudes, and $Q^f(\lambda)$ and $Q^b(\lambda)$ represents the matrix for forward and backward propagations, respectively. The field transmission and reflection coefficients of the mirrors at normal incidence are given by t and r, respectively. By summing the series, equation (3) can be further reduced to:

$$\frac{E(\lambda)}{E(\lambda)} = t[I - Q^f r Q^b r]^{-1} Q^f t, \quad (4)$$

where I is the 2×2 identity matrix. In this analysis, mirror absorption and other cavity losses are neglected and it is assumed that the mirror reflectivity is neither polarization dependent, nor wavelength dependent over the spectral range of operation. Under these assumptions, the complex transmission and reflection coefficients at normal incidence can be written as:

$$t = i\sqrt{1-R}\begin{pmatrix} 1 & 0 \\ 0 & 1 \end{pmatrix}; r = i\sqrt{R}\begin{pmatrix} 1 & 0 \\ 0 & -1 \end{pmatrix}, \quad (5)$$

where R is mirror reflectivity.

For the structure considered, the Jones matrix representing a single pass through the cavity is given by:

$$Q^f(\lambda) = Q^b(\lambda) = Q^{45°}_{QWP} Q^{0°}_{PM} Q^{-45°}_{QWP} \quad (6)$$

where:

$$Q^{\pm 45°}_{QWP} = \frac{e^{i\frac{\pi}{\lambda}(n_x + n_y)d_Q}}{\sqrt{2}} \begin{pmatrix} 1 & \pm i \\ \pm i & 1 \end{pmatrix}, \quad (7)$$

$$Q^{0°}_{PM} = e^{i\frac{\pi}{\lambda}(n_e(V) + n_o)d_l} \begin{pmatrix} e^{i\theta} & 0 \\ 0 & e^{-i\theta} \end{pmatrix},$$

are the Jones matrices for the two QWPs oriented at ±45° to the phase modulator and liquid crystal phase modulator oriented at 0° with optical phase retardation θ.

Polarization of arbitrary polarized input can be followed as light makes a round trip within the cavity. The Jones matrix is equal to $Q^f r Q^b r$. Substituting equations (5)–(7) into the above expression, gives:

$$Q^f r Q^b r = R \begin{pmatrix} 1 & 0 \\ 0 & 1 \end{pmatrix} e^{i\gamma} \quad (8)$$

where:

$$\gamma = \frac{\pi}{\lambda}[2(n_x + n_y)d_Q + (n_e(V) + n_o)d_l] \quad (9)$$

It is clear from the identity matrix of equation (8) that after one round trip the polarization of the input light is maintained. Here, x-polarized light returns to x and y-polarized light returns to y, with an increase of absolute phase γ. We now substitute equations (5)–(8) into equation (4), yielding the transmission function of the Fabry-Perot resonator:

$$t = \frac{1-R}{1-Re^{i2\gamma}} \begin{pmatrix} \cos\left(\frac{\theta}{2}\right) & \sin\left(\frac{\theta}{2}\right) \\ -\sin\left(\frac{\theta}{2}\right) & \cos\left(\frac{\theta}{2}\right) \end{pmatrix} \quad (10)$$

The FP transmission function can be removed from the matrix, yielding only a rotation matrix. This rotation matrix results because the initial conditions (the first path) for the two eigen states are different. Thus, provided that a polarization insensitive receiver follows the FP structure, all of the filtered light transmitted by the filter is available at the detector plane, regardless of incident polarization. The transmitted electromagnetic field is represented by:

$$E_x = \frac{1-R}{1-Re^{i2\gamma}} \left[ \cos\left(\frac{\theta}{2}\right) E_x + \sin\left(\frac{\theta}{2}\right) E_y \right] \quad (11)$$

$$E_y = \frac{1-R}{1-Re^{i2\gamma}} \left[ -\sin\left(\frac{\theta}{2}\right) E_x + \cos\left(\frac{\theta}{2}\right) E_y \right] \quad (12)$$

The total transmitted intensity for the QPQ (QWP-Phase Modulator-QWP) Fabry-Perot tunable filter is then equal to:

$$I = I_x + I_y = E_x \cdot E_x^* + E_y \cdot E_y^* = \frac{1}{1 + \frac{4R}{(1-R)^2}\sin^2(\gamma)} (A_x^2 + A_y^2), \quad (13)$$

where γ is described in equation (9), and $A_x$ and $A_y$ are the amplitudes of the input electromagnetic field along the x and the y axes, respectively. The QPQ Fabry-Perot filter is clearly insensitive to the input polarization.

Figure 3A:
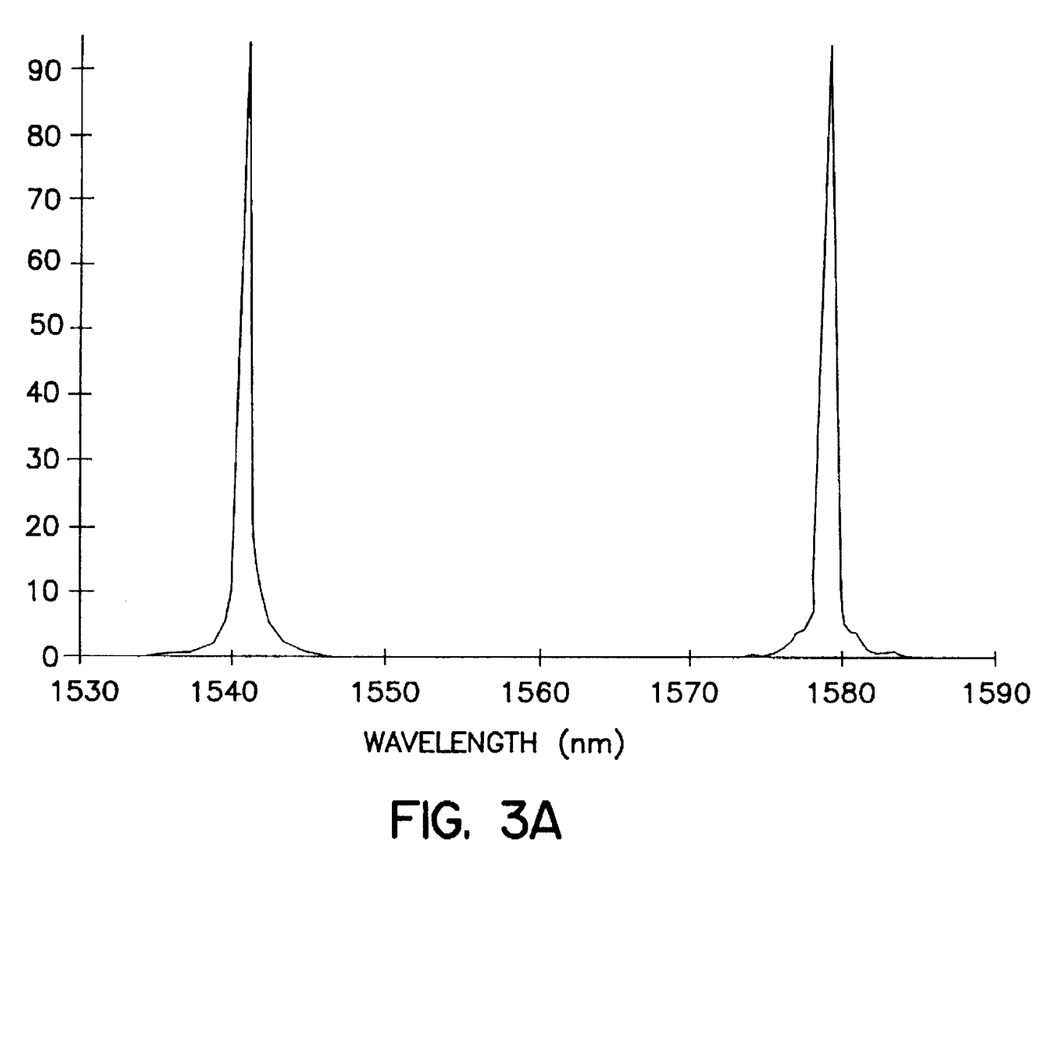
FIGS. 3 illustrates simulated spectra from a polarization-independent filter of FIG. 1. The two spectra (a and b) compare transmission with input of linearly polarized light with an azimuth angle of 30° (a) and elliptical light with 30° of ellipticity (b).
Figure 3B:
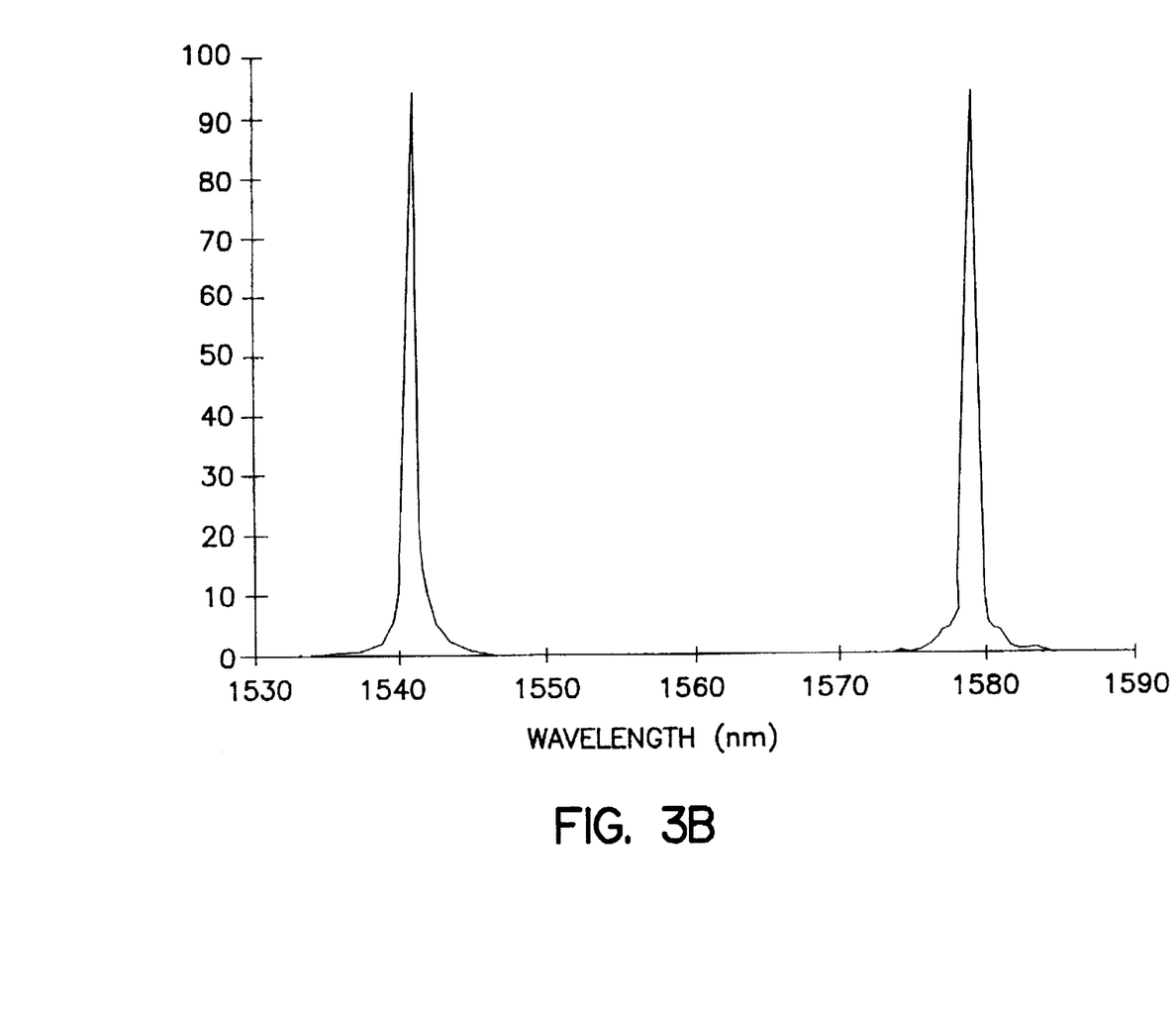

The QPQ-FP structure was tested in a computer analysis program, based on Berreman's 4×4 matrix formalism, for evaluating the anisotropic multi-layer structures. This comprehensive program allows the inclusion of reflections at the interfaces between layers, the polarization dependence of all elements, and the effect of oblique incidence on all layers. Results of this simulation are shown in FIG. 3 for FP transmission versus the wavelength. FIG. 3a has an input of linearly polarized light with an azimuth angle of 30°, and FIG. 3b has a left-handed elliptically polarized input with 40° azimuth angle and 30° of ellipticity. The two plots show exactly the same traces indicating that the QPQ-FP filter is polarization insensitive.

The polarization-independent filter of this invention can employ a planar aligned nematic liquid crystal cell as a phase modulator. The structure and operation of nematic liquid crystal cells, i.e. electro-optic modulators, are described, for example, in U.S. Pat. No. 4,779,959, issued Oct. 25, 1988, which is incorporated in its entirety by reference herein, and in references cited therein.

Figure 4:
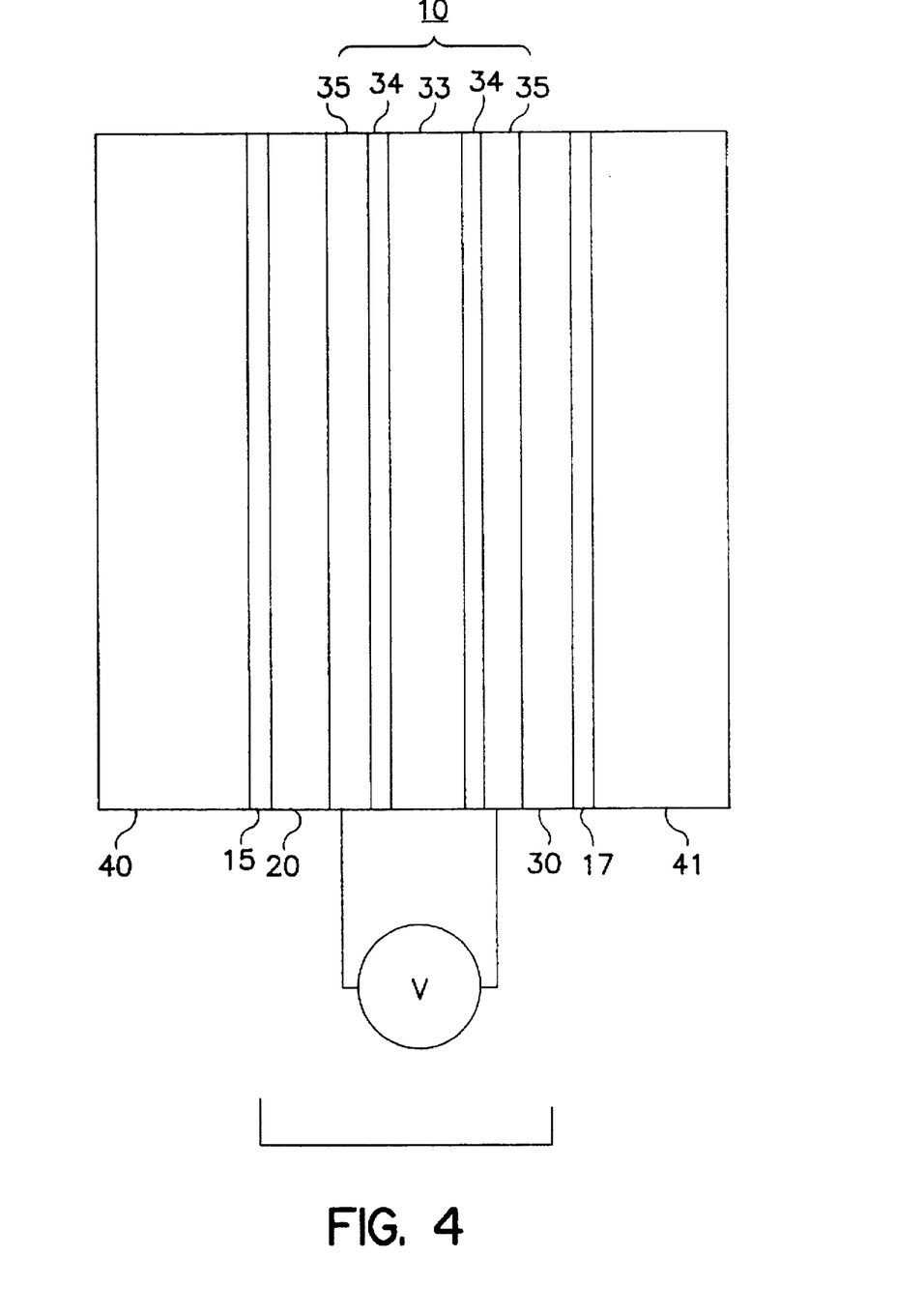
FIG. 4 is a schematic representation of an exemplary polarization-independent FP filter of this invention which incorporates a phase modulator that is a planar-aligned nematic liquid crystal cell with parallel electrode plates.

FIG. 4 illustrates a cross-sectional view of a polarization-independent filter employing a planar aligned nematic cell 10 as a phase modulator. The phase modulator comprises a nematic liquid crystal layer 33 aligned between appropriate alignment layers 34, which induce desired planar alignment of the LC layer and parallel electrodes 35 across which an electric field is applied to modulate phase. The FP filter of FIG. 4 also includes quarter-wave plates 20 and 30 oriented perpendicular (i.e., orthogonal) to each other and at ±45° with respect to the optic axis of the phase modulator. The FP cavity is formed by reflective surfaces 15 and 17, deposited, for example, on transparent substrates 40 and 41.

Figure 5A:
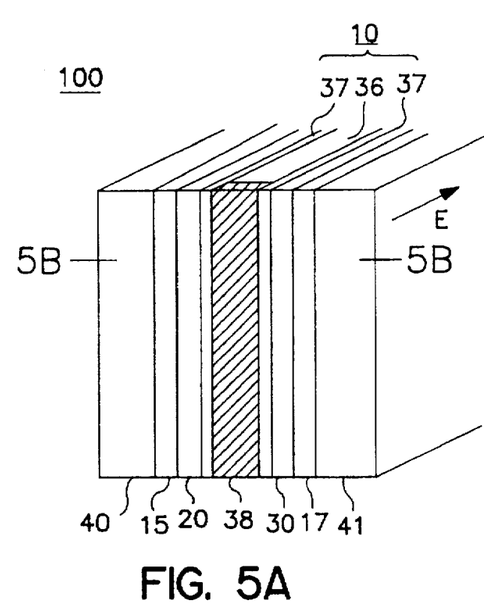
FIG. 5 is a schematic representation of another exemplary polarization-independent FP filter of this invention which incorporates a phase modulator that is a homeotropically aligned LC cell with lateral electrodes.
Figure 5B:
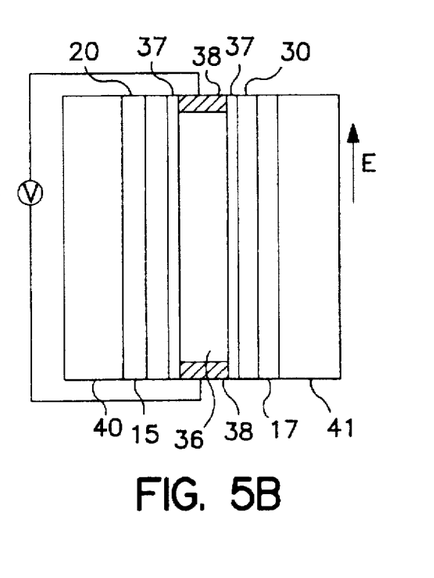

The polarization-independent filter of this invention can employ homeotropically aligned LC cells as phase modulators. In particular, a polarization-independent FP filter employing a lateral electrode smectic liquid crystal cell phase modulator is illustrated in FIG. 5. The structure and operation of homeotropically aligned lateral electrode smectic liquid crystal devices is described, for example, in U.S. patent application Ser. No. 08/056,415, filed May 3, 1993 no. 5,493,426 FIG. 5 (in end view or cross-section B) shows phase modulator 10 comprising a smectic liquid crystal layer 36 homeotropically aligned between appropriate alignment layers 37 which induce desired homeotropic alignment. An electric field is applied across the LC layer as indicated via lateral electrodes 38. The polarization-independent FP 100 includes QWPs 20 and 30 oriented perpendicular to each other and at + or −45° with respect to the optic axis of the LC cell. The FP cavity is formed by reflective surfaces 15 and 17 which are, for example, deposited on substrate walls 40 and 41.

Figure 6:
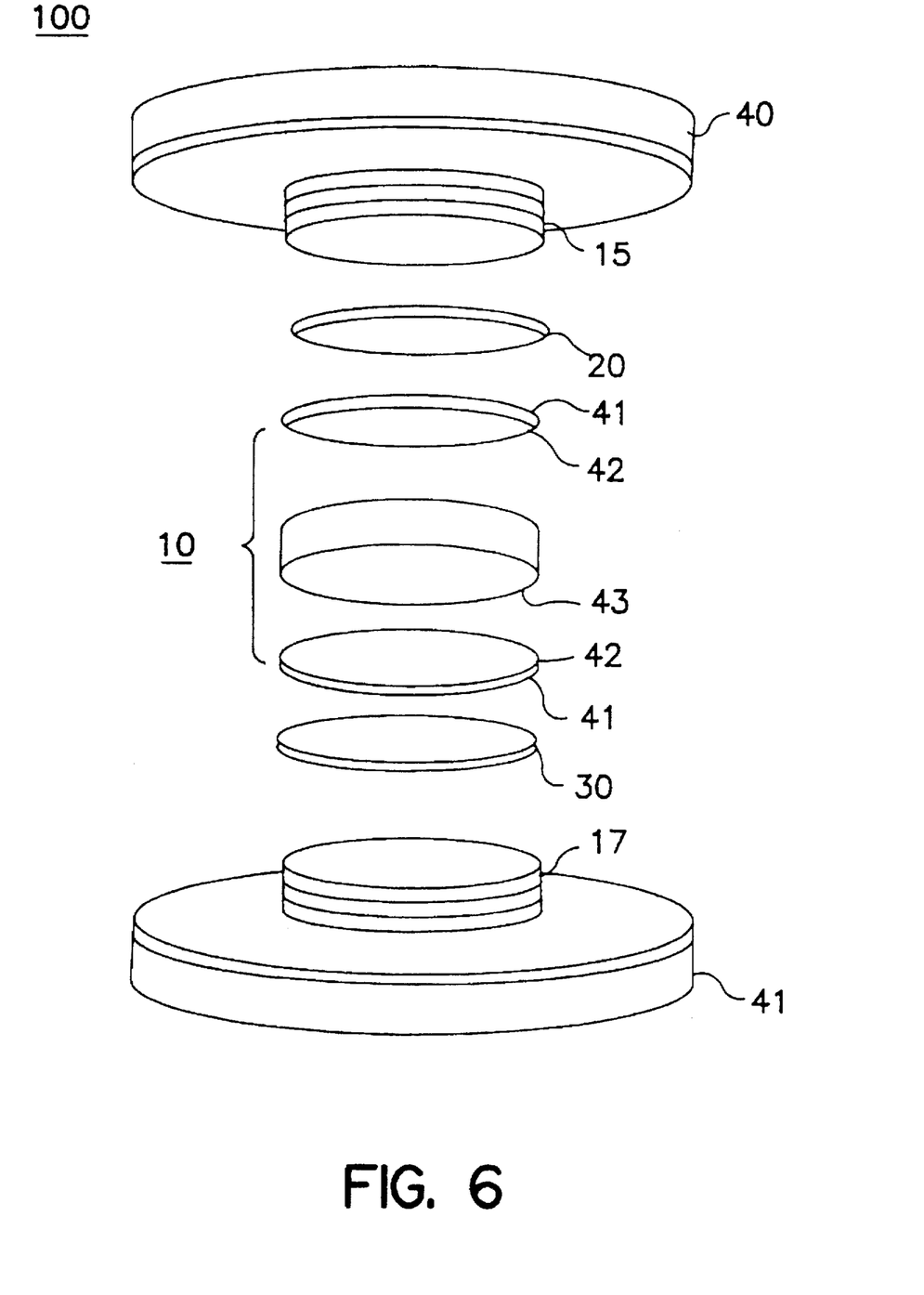
FIG. 6 is a schematic representation of a third exemplary polarization-independent FP filter of this invention which incorporates a phase modulator that is a smectic liquid crystal analog phase modulator.

The polarization-independent filter of this invention can employ a smectic liquid crystal analog phase modulator with a chevron or titled layer alignment as described in U.S. Pat. No. 5,510,414, which is incorporated in its entirety by reference herein. The FP devices described therein are made polarization-independent by introducing properly oriented QWPs into the FP cavity on either side of the analog phase modulator. As shown in FIG. 6, a polarization-independent FP filter 100 containing an analog phase modulator 10 comprises substrates 40 and 41 with reflective surfaces 15 and 17 to form the FP cavity. QWPs 20 and 30 are inserted between the reflective surfaces and the phase modulator. The phase modulator 10 comprises a transparent electrode layer, and an alignment layer 42 on either side of the liquid crystal layer 43 (the alignment layers are positioned adjacent to the LC layer). Preferably the reflective surface, quarter-wave plate, transparent electrode, and an alignment layer will be sequentially layered or deposited on each substrate. The relative orientations of the QWP plates with respect to each other and the phase modulator which are required for polarization-independent operation can be readily achieved by known methods of deposition and alignment. The LC layer is aligned as described in the U.S. Pat. No. 5,510,914 between the two multi-layered substrates to form the polarization-independent filter.

The analog phase modulators of the application Ser. No. 08/153,079 comprise a pair of substrates, smectic layers of liquid crystal aligned so that they are not parallel to the cell walls, and a means for applying an electric field perpendicular to the cell walls. The smectic liquid crystal forms an oblique angle with either substrate (cell wall). The phase modulator employs a means for aligning the smectic layers which can comprise an alignment layer. This alignment layer can, for example, be a rubbed polymer coating such as nylon 66, PVA, PBT or silane or obliquely evaporated $SiO_x$. The substrates coated with the alignment layer are aligned anti-parallel to produce the quasi-bookshelf structure or parallel to produce a chevron structure. The substrate itself can be rubbed to promote a quasi-bookshelf or chevron alignment. The liquid crystal layer employed in the phase modulator can be a smectic C*, a smectic A or DHF liquid crystal layer. Alignment layers can promote quasi-bookshelf or chevron layer structures and the liquid crystal layer thickness can be chosen to be larger than that which can be surface stabilized into a bookshelf alignment (i.e. larger than 2–3 μm).

U.S. Pat. No. 5,361,320 issued Nov. 11, 1994, which is incorporated by reference in its entirety herein, describes optical fiber waveguides with liquid crystal cores aligned parallel to, orthogonal to or in a tilted alignment with respect to the fiber axis. When such fiber waveguides are provided with means for applying an electric field with a component in a direction orthogonal to the fiber axis, they can function as a LC cell to modulate the phase, polarization or both phase and polarization of elliptically polarized light guided through the fiber. These fiber waveguide modulators can incorporate nematic or smectic liquid crystals. Smectic liquid crystals useful in such modulators include, among others smectic A, smectic C*, or DHF materials. The fiber waveguides are described in combination with polarizers, optical cavities (FP cavities) and birefringent elements to provide amplitude modulation and spectral filtering. Fiber waveguide phase modulator configurations can be employed in the polarization-independent FP filters of this invention by introduction of QWPs into the fiber wave guide FP cavity configurations shown in U.S. Pat. No. 5,361,320.

In general any passive or active QWPs can be employed in the FP filters of this invention, including among others those that are LC cells, those that are passive birefringent elements, or those that are fabricated by deposition on substrates or mirrors.

For certain applications the thickness of the QWPs can be important. For telecommunications at 1550 nm, a free spectral range (FSR) of about 40 nm or more is preferred. To achieve the preferred (FSR), a FP cavity thickness of less than about 20 μm is needed, assuming an average index of refraction of about 1.5. True zero-order QWPs made of quartz have a thickness of about 40 μm at λ=1550 nm (1.55 μm). A FP filter of FIG. 1 with two intracavity quartz QWPs and one liquid crystal phase modulator (at a thickness of about 10 μm) would have a free spectral range (FSR) of only about 10 μm. This range is too narrow for application to EDFA WDM systems. Assuming the phase modulator has a thickness of 10 μm (as in an LC phase modulator), the preferred QWP thickness for EDFA WDM systems will be equal to or less than about 5 μm with optical birefringence (Δn)=0.08. In preferred narrow FP cavity configuration, the QWPs are deposited or otherwise attached at the intra cavity surfaces of the reflective surfaces that form the FP.

Various methods are available for generation of thin zero order QWPs, including, for example, those made from liquid crystal polymers, high angle evaporated metal oxide thin films, and stretched polymer films. Liquid crystal polymers have relatively large optical birefringence, ~Δn=0.15, of the same order of magnitude as liquid crystal materials. A zero order QWP at 1550 nm prepared from LC polymers would only be about 2.6 μm in thickness. LC polymers have been used primarily for nonoptical molding and extrusion applications. Cross-linkable LC silicone materials that can be polymerized into a glassy state using UV light are commercially available. Once cured, a thin LC retarder film is left on the supporting substrate.

Optical anisotropy of an obliquely evaporated metal oxide thin film is a well-known phenomenon in thin film coating applications. Motohiro and Yaga (1989), *Applied Optics* 28:2466–2482 reported the construction of wave retardation plates from $Ti_2O_5$ by this method. The QWP illustrated therein had a thickness of 2 μm in the visible with a large optical birefringence Δn of about 0.07 to 0.08 and very small loss. Similar techniques have been used to achieve Δn of about 0.10. (See: Hodgkinson (1991), *Applied Optics* 30:1303–1312).

Stretched polymers can also be used to achieve a thin QWP at λ=1550 nm. Low cost stretched polymers with optical birefringence (Δn) of about 0.05 are commercially available. Stretch polymer QWP's may be less preferred for certain applications due to possible poor wavefront distortion, and integration problems associated with cementing the film onto a mirror. Stretched polymer QWP can be thicker than evaporated thin layers so that higher voltages may be required to address LC with ITO.

The method disclosed herein for obtaining polarization-independence applies to LC-FP filters, as well as to other birefringence-based FP tunable filters. Multi-layer QPQ FP structures will enhance and broaden the usefulness of liquid crystal based tunable filters relative to other technologies, such as acousto-optic tunable filters.

Figure 7:
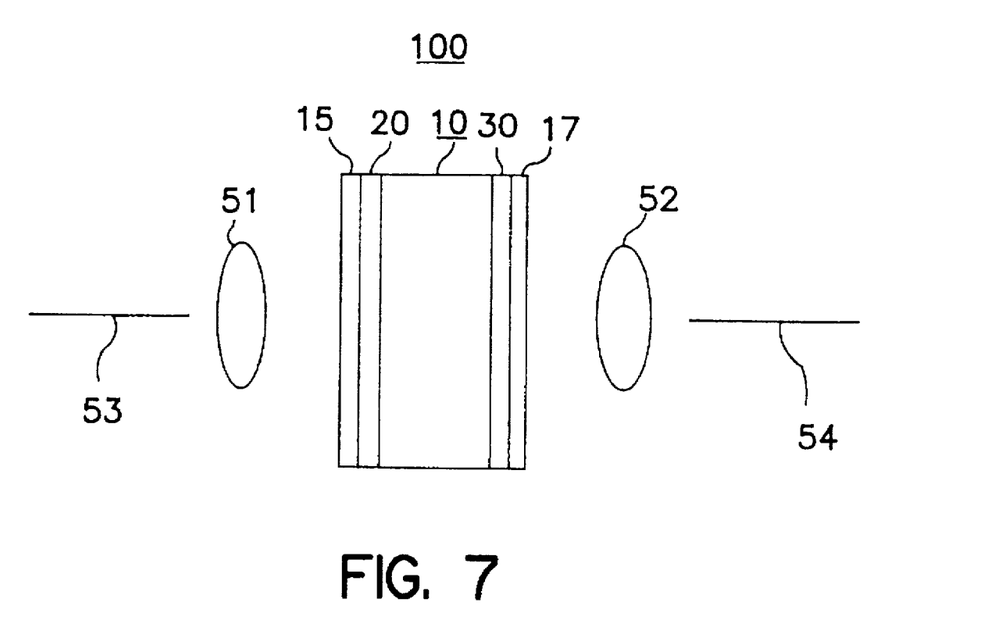
FIG. 7 is a schematic representation of a polarization-independent filter of this invention adapted to a fiber optic system.

The FP filters of this invention can be used in fiber Fabry-Perot filter (FFP) design configurations (both in lensed FFP configurations and FFP ferrule assembly configurations). The FP filter configurations of this invention can be readily adapted to such fiber systems. FIG. 7 illustrates an FFP configuration of this invention in which a polarization-independent filter ≈100 is introduced into a fiber optic system. FIG. 7 illustrates one means for introducing light from a fiber (53) to the filter 100, lens 51. Modulated light exits the filter, and returns to fiber 54 in transmission mode via lens 52. Other means for conducting light from fibers into Fabry-Perot filters and back into fibers after modulation are known in the art.

The FP filters of this invention can be employed generally in any optical devices or optical systems where polarization-insensitive filtering is beneficial. The inventive FP filters can be combined with any desired optical elements or devices for use in a given application.

The FP filters of this invention are useful in fiber-based optical sensors particularly in those employing long (0.5 meters or longer) fibers and in remote sensing applications.

Those of ordinary skill in the art will appreciate that alternative methods, configurations, materials, optical elements and combination of elements other than those specifically described herein can be employed in view of the descriptions herein to generate functionally equivalent polarization-independent filters. All such alternatives are within the scope and spirit of this invention.

We claim:

1. A polarization-independent Fabry-Perot filter which comprises:

a Fabry-Perot cavity formed by two opposed reflective surfaces, a first and a second quarter wave plate within said Fabry-Perot cavity and a phase modulator between said first and second quarter wave plates wherein the optic axes of said first and second quarter-wave plates are oriented perpendicular to each other and at an angle of + or −45° ($\pi/4$) to the optic axis of the phase modulator.

2. The polarization-independent filter of claim 1 operated in reflection mode wherein one of the reflective surfaces of said Fabry Perot cavity has reflectivity of about 1.

3. The polarization-independent filter of claim 1 operated in transmission reflection mode wherein both of the reflective surfaces forming the Fabry Perot cavity have reflectivity less than 1.

4. The polarization-independent filter of claim 1 which does not have entrance or exit polarizers.

5. The polarization-independent filter of claim 1 wherein said phase modulator is a nematic liquid crystal cell.

6. The polarization-independnet filter of claim 1 wherein said phase modulator is an analog smectic liquid crystal phase modulator wherein the smetic liquid crystal cell has a chevron or titlted layer alignment.

7. The polarization-independent filter of claim 1 wherein said phase modulator is a homeotropically aligned liquid crystal cell.

8. The polarization-independent filter of claim 1 wherein said phase modulator is a smectic liquid crystal cell with a chevron or tilted layer alignment.

9. The polarization-independent filter of claim 1 wherein said quarter wave plates are true zero order quarter wave plates at the design wavelength.

10. The polarization-independent filter of claim 1 wherein said quarter wave plates are formed by oblique deposition of metal oxide thin films.

11. The polarization-independent filter of claim 1 wherein said quarter wave plates are formed by a cured coating of liquid crystal polymer.

12. The polarization-independent filter of claim 1 wherein said quarter-wave plates are formed from stretched polymer films.

13. A polarization-independent filter for use in a fiber optic system which comprises a fiber optic light source, a Fabry-Perot cavity formed by two opposed reflective surfaces; means for introducing light from said fiber optic light source into said Fabry-Perot cavity; a first and a second quarter wave plate within said Fabry-Perot cavity; a phase modulator between said first and second quarter wave plates wherein the optic axes of said first and second quarter-wave plates are oriented perpendicular to each other and at an angle of + or −45° ($\pi/4$) to the optic axis of the phase modulator, and means for conducting filtered light from said filter.

14. The polarization-independent filter of claim 13 which requires no means for selecting the polarization of entering or exiting light.

15. The polarization-independent filter of claim 13 wherein said Fabry Perot cavity is about 20 μm or less in thickness.

16. The polarization-independent filter of claim 13 wherein said quarter wave plates are true zero order quarter wave plates at the design wavelength.

17. A method for achieving polarization-independent filtering of input light of arbitrary polarization which comprises the steps of:

(a) introducing light of arbitrary unselected polarization into a Fabry-Perot filter which filter consists essentially of:

a Fabry-Perot cavity formed by two opposed reflective surfaces, a first and a second quarter-wave plate within said Fabry-Perot cavity and a phase modulator between said first and second quarter-wave plates wherein the optic axes of said first and second quarter-wave plates are oriented perpendicular to each other and at an angle of + or −45° ($\pi/4$) to the optic axis of the phase modulator; and (b) detecting the output of the filter.

18. The method of claim 17 wherein said quarter-wave plates are true zero order quarter-wave plates at the design wavelength.

19. The method of claim 1 wherein said phase modulator is a nematic liquid crystal cell.

20. The method of claim 17 wherein said phase modulator of said filter is an analog smectic liquid crystal phase modulator wherein the smetic liquid crystal cell has a chevron or titlted layer alignment.

21. The method of claim 17 wherein said phase modulator is a homeotropically aligned liquid crystal cell.

22. The method of claim 17 wherein said phase modulator is a smectic liquid crystal cell with a chevron or tilted layer alignment.

23. A fiber optic sensor which comprises the polarization-independent Fabry Perot filter of claim 1.

24. The polarization-independent filter of claim 1 wherein said phase modulator does not achieve modulation by varying the polarization of input light.

25. The polarization-independent filter of claim 13 wherein said phase modulator does not achieve modulation by varying the polarization of input light.

26. The method of claim 17 wherein said phase modualtor of said filter does not achieve modulation by varying the polarization of input light.

* * * * *

UNITED STATES PATENT AND TRADEMARK OFFICE
CERTIFICATE OF CORRECTION

PATENT NO. : 5,781,268

DATED : July 14, 1998

INVENTOR(S) : Liu et al.

It is certified that error appears in the above-identified patent and that said Letters Patent is hereby corrected as shown below:

In claim 6, line 1, delete "independnet" and replace with --independent--.

In claim 19, line 1, delete "claim 1" and replace with --claim 17--.

In claim 26, line 1, delete "modualtor" and replace with --modulator--.

In column 1, line 6, delete "FB" and replace with --FP--.

In column 1, line 41, insert a period before the closing parenthesis.

In column 2, line 30, delete "modulator" and replace with --modulators--.

In column 3, line 1, insert --filters-- between "FP" and "of".

In column 3, line 61, insert --of-- between "levels" and "throughput".

In column 6, equation 2, delete "$d_1$" at the end of the equation and replace with --$d_l$--.

In column 6, line 62, delete "represents" and replace with --represent--.

In column 8, lines 54 and 55, delete "application Ser. No. 08/056,415, filed May 3, 1993" and place a period after "5,493,426".

In column 9, line 2, delete "5,510,414" and replace with --5,510,914--.

In column 9, lines 23 and 24, delete "application Ser. No. 08/153,079" and replace with --U.S. patent No. 5,510,914--.

UNITED STATES PATENT AND TRADEMARK OFFICE
CERTIFICATE OF CORRECTION

PATENT NO. : 5,781,268
DATED : July 14, 1998
INVENTOR(S) : Liu et al.

It is certified that error appears in the above-identified patent and that said Letters Patent is hereby corrected as shown below:

In column 9, line 50, delete "a" before "LC cell" and replace with "an".

In column 10, line 63, delete "≈" preceding "100".

In column 11, line 13, delete "combination" and replace with --combinations--.

Signed and Sealed this

Ninth Day of March, 1999

Attest:

Attesting Officer

Q. TODD DICKINSON

Acting Commissioner of Patents and Trademarks